United States Patent
Ouellet et al.

(10) Patent No.: US 10,719,220 B2
(45) Date of Patent: Jul. 21, 2020

(54) DYNAMIC SCROLLING (71) Applicant: Autodesk, Inc., San Rafael, CA (US)

(72) Inventors: Roxane Ouellet, St-Lambert (CA); D. J. Rahming, Montreal (CA)

(73) Assignee: AUTODESK, INC., San Rafael, CA (US)

( * ) Notice: Subject to any disclaimer, the term of this patent is extended or adjusted under 35 U.S.C. 154(b) by 274 days.

(21) Appl. No.: 15/085,508

(22) Filed: Mar. 30, 2016

(65) Prior Publication Data
US 2016/0291825 A1 Oct. 6, 2016

Related U.S. Application Data (60) Provisional application No. 62/141,094, filed on Mar. 31, 2015.

(51) Int. Cl.
*G06F 3/0485* (2013.01)
*G06F 3/0483* (2013.01)
*G06F 16/54* (2019.01)

(52) U.S. Cl.
CPC .......... *G06F 3/0485* (2013.01); *G06F 3/0483* (2013.01); *G06F 16/54* (2019.01); *G06F 2203/04803* (2013.01)

(58) Field of Classification Search
CPC .. G06F 3/0485; G06F 3/0482; G06F 3/04845; G06F 17/30274; G06F 2203/04803
See application file for complete search history.

(56) References Cited

U.S. PATENT DOCUMENTS

| | | | | |
|---|---|---|---|---|
| 5,524,193 A | * | 6/1996 | Covington | ............ G06F 16/748 715/210 |
| 5,701,137 A | * | 12/1997 | Kiernan | ................ G06F 9/4443 715/853 |
| 5,712,995 A | * | 1/1998 | Cohn | .................... G06F 3/0481 715/792 |

(Continued)

OTHER PUBLICATIONS

"Autodesk Flame Premium 2014: User Guide", Autodesk, Inc., Sep. 17, 2012. http://images.autodesk.com/adsk/files/flamepremium-2014-user-guide.pdf.

(Continued)

*Primary Examiner* — Jung-Mu T Chuang
(74) *Attorney, Agent, or Firm* — Gates & Cooper LLP (57) ABSTRACT

A method, system, and computer program product provide the ability to structure an interactive and dynamic display of hierarchically organized media content. A library of the media content is acquired. The hierarchical structure of the content is graphically represented utilizing text corresponding to the hierarchical levels with a child level represented below and indented from a parent level. The content is graphically represented using (thumbnail) images that are left justified with respect to a highest hierarchical level, and directly below the text corresponding to the containing level. As scrolling of the media content is performed, the display is dynamically updated by sliding the images until all of the representative images have slid off, at which point, the text for the containing level slides under its own parent, leaving text corresponding to sibling levels of the containing level displayed.

12 Claims, 10 Drawing Sheets

(56) References Cited

U.S. PATENT DOCUMENTS

| | | | | |
|---|---|---|---|---|
| 5,838,319 A * | 11/1998 | Guzak | G06F 3/0481 | 715/854 |
| 5,917,492 A * | 6/1999 | Bereiter | G06F 3/0489 | 715/799 |
| 5,923,328 A * | 7/1999 | Griesmer | G06F 3/0481 | 715/769 |
| 5,982,350 A * | 11/1999 | Hekmatpour | H04N 5/262 | 345/473 |
| 6,279,018 B1 * | 8/2001 | Kudrolli | G06F 17/277 | 715/234 |
| 6,380,947 B1 * | 4/2002 | Stead | G06F 3/0482 | 345/645 |
| 6,392,673 B1 * | 5/2002 | Andrew | G06F 3/0481 | 715/788 |
| 6,405,238 B1 * | 6/2002 | Votipka | G06F 16/954 | 709/203 |
| 6,414,700 B1 * | 7/2002 | Kurtenbach | G06F 3/0482 | 715/810 |
| 6,448,985 B1 * | 9/2002 | McNally | G06F 3/0481 | 715/784 |
| 6,532,039 B2 * | 3/2003 | Anderson | H04N 1/32144 | 348/231.3 |
| 6,959,348 B1 * | 10/2005 | Chan | H04N 9/8042 | 375/240.01 |
| 7,072,495 B2 * | 7/2006 | Harrington | G06F 17/211 | 382/112 |
| 7,328,411 B2 * | 2/2008 | Satanek | G06F 3/04855 | 715/786 |
| 7,360,175 B2 * | 4/2008 | Gardner | G06F 3/0482 | 715/825 |
| 7,412,444 B2 * | 8/2008 | Gaponoff | G06F 17/30327 | |
| 7,412,647 B2 * | 8/2008 | Sellers | G06F 17/217 | 715/243 |
| 7,464,343 B2 * | 12/2008 | Shaw | G06F 3/0482 | 715/850 |
| 7,479,971 B2 * | 1/2009 | Meier | G06F 3/04812 | 345/157 |
| 7,680,814 B2 * | 3/2010 | Mercer | G06F 17/30056 | 84/600 |
| 8,060,817 B2 * | 11/2011 | Goldberg | G06F 17/245 | 715/200 |
| 8,095,872 B2 * | 1/2012 | Sellers | G06F 17/217 | 715/243 |
| 8,296,682 B2 * | 10/2012 | Sloo | G06F 17/30126 | 715/853 |
| 8,402,361 B2 * | 3/2013 | Goldberg | G06F 17/245 | 715/200 |
| 8,443,278 B2 * | 5/2013 | Mansfield | G06F 17/211 | 715/227 |
| 8,555,193 B2 * | 10/2013 | Sar | G06F 9/451 | 715/781 |
| 8,577,692 B2 * | 11/2013 | Silkaitis | G06F 19/00 | 705/2 |
| 8,640,048 B1 * | 1/2014 | Parsons | G06F 17/2247 | 715/206 |
| 9,118,967 B2 * | 8/2015 | Sirpal | H04N 1/00448 | |
| 9,182,948 B1 * | 11/2015 | O'Riordan | G05B 19/0426 | |
| 9,354,770 B2 * | 5/2016 | Hosotsubo | G06F 3/0481 | |
| 9,389,981 B2 * | 7/2016 | Milirud | G06F 11/323 | |
| 9,606,764 B2 * | 3/2017 | Jenks | G06F 3/1446 | |
| 9,672,558 B2 * | 6/2017 | Egen | G06Q 30/0631 | |
| 9,720,560 B2 * | 8/2017 | Prakash | G06F 3/04812 | |
| 9,733,801 B2 * | 8/2017 | Audet | G06F 3/0482 | |
| 2001/0033296 A1 * | 10/2001 | Fullerton | G06F 17/30017 | 715/730 |
| 2002/0120633 A1 * | 8/2002 | Stead | G06F 3/0482 | |
| 2002/0196287 A1 * | 12/2002 | Taylor | G06F 3/0481 | 715/792 |
| 2003/0033402 A1 * | 2/2003 | Battat | G06F 3/0481 | 709/224 |
| 2003/0154204 A1 * | 8/2003 | Chen-Wright | G06F 17/30607 | |
| 2003/0202019 A1 * | 10/2003 | Detweiler | G06F 3/0482 | 715/853 |
| 2004/0093562 A1 * | 5/2004 | Diorio | G06F 17/30873 | 715/205 |
| 2004/0125124 A1 * | 7/2004 | Kim | G06F 17/30799 | 715/716 |
| 2005/0028099 A1 * | 2/2005 | Harrington | G06F 17/211 | 715/234 |
| 2006/0036568 A1 * | 2/2006 | Moore | G06F 16/168 | |
| 2006/0101324 A1 * | 5/2006 | Goldberg | G06F 17/245 | 715/227 |
| 2006/0161867 A1 * | 7/2006 | Drucker | G06F 16/68 | 715/810 |
| 2006/0200752 A1 * | 9/2006 | Sellers | G06F 17/217 | 715/209 |
| 2006/0218193 A1 * | 9/2006 | Gopalakrishnan | G06F 16/44 | |
| 2007/0124695 A1 * | 5/2007 | Brodie | G06F 3/0481 | 715/781 |
| 2008/0016474 A1 * | 1/2008 | Guido | G06F 17/30994 | 715/854 |
| 2008/0118160 A1 * | 5/2008 | Fan | G06F 17/3028 | 382/225 |
| 2009/0036105 A1 * | 2/2009 | Carion | G06F 9/451 | 455/414.1 |
| 2009/0037724 A1 * | 2/2009 | Carion | G06F 9/452 | 713/100 |
| 2009/0049372 A1 * | 2/2009 | Goldberg | G06F 17/245 | 715/227 |
| 2009/0063517 A1 * | 3/2009 | Wright | G06F 17/30274 | |
| 2009/0063547 A1 * | 3/2009 | Wright | G06F 17/30274 | |
| 2009/0083676 A1 * | 3/2009 | Flanagan | G06F 16/248 | 715/853 |
| 2009/0164939 A1 * | 6/2009 | Ishimitsu | G06F 9/4443 | 715/805 |
| 2009/0216683 A1 * | 8/2009 | Gutierrez | G06Q 30/02 | 705/80 |
| 2010/0017361 A1 * | 1/2010 | Pan | G06Q 30/0601 | 705/26.1 |
| 2010/0174979 A1 * | 7/2010 | Mansfield | G06F 17/211 | 715/234 |
| 2010/0192066 A1 * | 7/2010 | Wu | G06F 16/64 | 715/727 |
| 2010/0321410 A1 * | 12/2010 | Jenks | G06F 3/1446 | 345/676 |
| 2011/0074824 A1 * | 3/2011 | Srinivasan | G06F 3/04883 | 345/660 |
| 2011/0145753 A1 * | 6/2011 | Prakash | G06F 3/0481 | 715/783 |
| 2012/0030264 A1 * | 2/2012 | Horn | G06F 17/3002 | 707/829 |
| 2012/0084656 A1 * | 4/2012 | Garroch | G06F 3/0481 | 715/732 |
| 2012/0130308 A1 * | 5/2012 | Silkaitis | G06F 19/00 | 604/151 |
| 2012/0221971 A1 * | 8/2012 | Trotta | G06F 3/0482 | 715/803 |
| 2012/0246207 A1 * | 9/2012 | Evans | G06F 17/30126 | 707/829 |
| 2012/0317519 A1 * | 12/2012 | Denkel | G06F 3/0482 | 715/854 |
| 2013/0198661 A1 * | 8/2013 | Matas | G06F 3/048 | 715/762 |
| 2013/0265222 A1 * | 10/2013 | Berenson | G06F 3/0482 | 345/156 |
| 2014/0053195 A1 * | 2/2014 | Sirpal | H04N 21/42219 | 725/40 |
| 2014/0109015 A1 * | 4/2014 | Farn | G06F 17/30961 | 715/854 |
| 2014/0157188 A1 * | 6/2014 | Miura | G06F 3/0482 | 715/784 |
| 2015/0067581 A1 * | 3/2015 | Wu | G06F 3/0485 | 715/784 |
| 2015/0106748 A1 * | 4/2015 | Monte | G06Q 10/10 | 715/753 |
| 2015/0124000 A1 * | 5/2015 | Giambalvo | G06F 17/30058 | 345/661 |

(56) References Cited

U.S. PATENT DOCUMENTS

| | | | |
|---|---|---|---|
| 2015/0339002 A1* | 11/2015 | Arnold | G06F 3/0481 |
| | | | 715/854 |
| 2015/0339006 A1* | 11/2015 | Chaland | G06F 3/0482 |
| | | | 715/835 |
| 2016/0042021 A1* | 2/2016 | Lucca | G06F 17/30327 |
| | | | 707/804 |
| 2016/0266738 A1* | 9/2016 | Martello | G06F 17/2241 |
| 2016/0275067 A1* | 9/2016 | Mei | G06F 17/248 |
| 2016/0300079 A1* | 10/2016 | Gong | G06F 21/6218 |
| 2017/0262248 A1* | 9/2017 | Jenks | G06F 3/1446 |
| 2018/0046413 A1* | 2/2018 | Martin | H04N 1/00411 |

OTHER PUBLICATIONS

"Autodesk Flame Premium 2015: User Guide", Autodesk, Inc., 2015. http://docs.autodesk.com/flamepremium2015/flamepremium2015.pdf.

"Autodesk Smoke 2015 User Guide", Autodesk, Inc., May 2014. http://docs.autodesk.com/smoke2015-user-guide/smoke2015-user-guide.pdf.

"Autodesk Flame Assist 2015 User Guide", Extension 1, Autodesk, Inc., 2015. http://docs.autodesk.com/flameassist2015/flame-assist-2015x1_user-guide.pdf.

* cited by examiner

DYNAMIC SCROLLING

CROSS-REFERENCE TO RELATED APPLICATIONS

This application claims the benefit under 35 U.S.C. Section 119(e) of the following and commonly-assigned U.S. provisional patent application(s), which is/are incorporated by reference herein:

Provisional Application Ser. No. 62/141,094, filed on Mar. 31, 2015, with inventor(s) D. J. Rahming and Roxane Ouellet, entitled "Dynamic Scrolling,".

BACKGROUND OF THE INVENTION

1. Field of the Invention

The present invention relates generally to media content viewing applications, and in particular, to a method, apparatus, and article of manufacture for dynamically scrolling through a large quantity of visual data in deep hierarchies.

2. Description of the Related Art

It is notoriously difficult to manage large quantities of visual data (e.g., video clips and/or static images). Applications using such data either let the user see the contents in thumbnails of a single folder at once, making scanning virtually impossible, or integrate thumbnails in the hierarchy and cause the user to loose context. Scanning is an important task as media is not always identified properly and visual recognition is used. To better understand the problem, a description of prior art media content viewing applications may be useful.

Often times, users have a need to locate a particular video clip (and/or static image) from within one or more extensive clip libraries/folders. For example, a user may be editing a film that contains hundreds or thousands of clips and the user must browse/search through libraries/folders to identify the clip of interest. Once located, the user can select the clip for further editing.

Prior art systems provide various methods for searching/locating such media/video clips/static images. For example, a user may scroll through a list of media until found. In such prior art systems, a significant portion of the screen real estate may be consumed by images. In this regard, an image from the clip may be displayed in a thumbnail or miniature version so that the user can scroll through the images searching for the desirable clip. Unfortunately, since the images consume significant screen real estate, the context of the clip within the media library/film may be lost. For example, the location within a hierarchy (in which clips are represented based on one or more properties) may not be visible. Alternatively, a hierarchy may be shown, but such a hierarchy may consume significant screen real estate leaving little to no room for the thumbnail images.

Figure 1A:
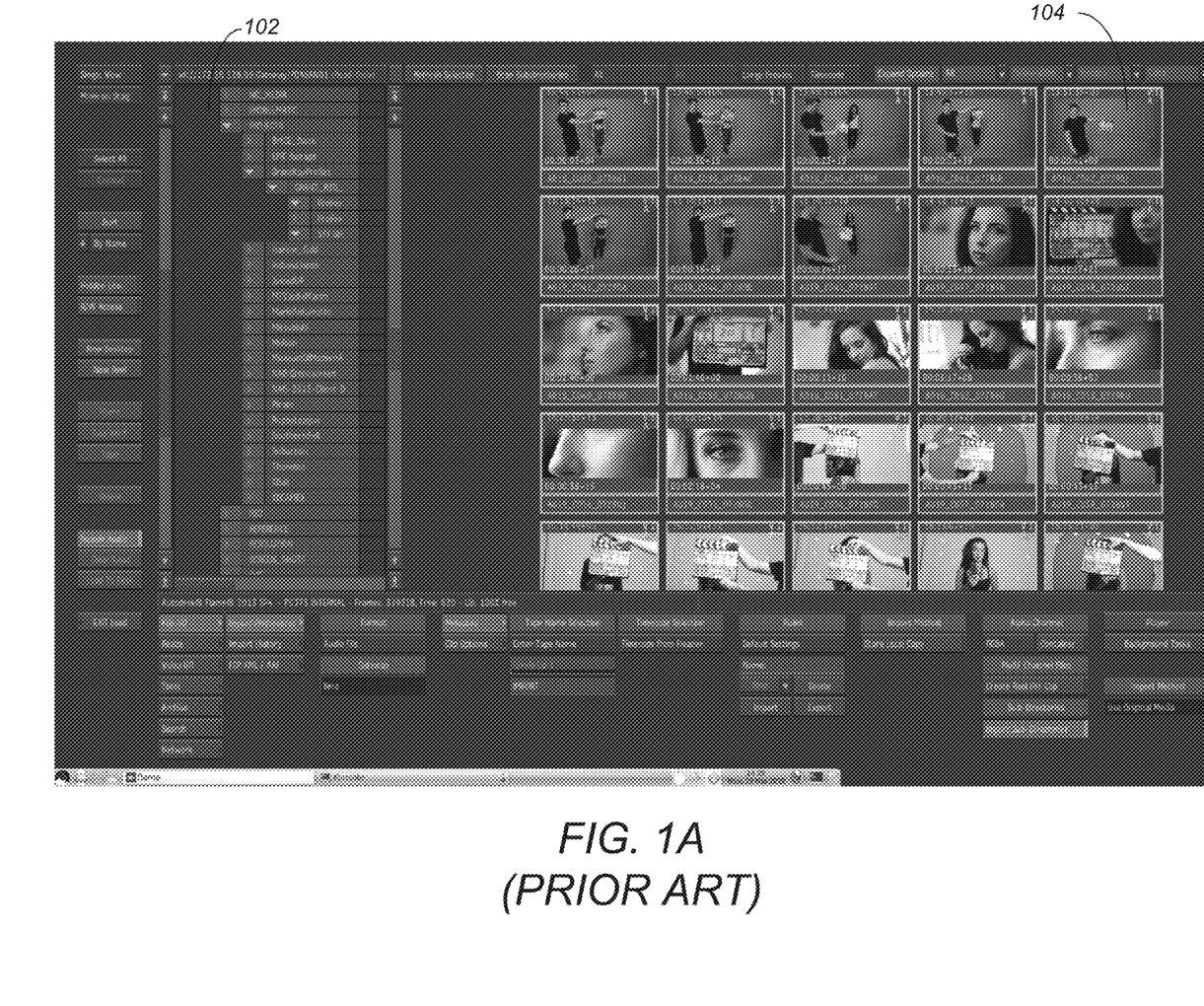
FIG. 1A illustrates a prior art screen shot for viewing media content with a hierarchical listing of the folder structure is displayed in a first area and thumbnails representing the media content clips are displayed in a second viewing area.

In an example of prior art product (e.g., SMOKE AND FLAME 2012™ available from AUTODESK, INC., the assignee of the present invention), media held in libraries may be viewable as thumbnails or a list within a hierarchy. FIG. 1A illustrates a prior art screen shot for viewing media content with a hierarchical listing of the folder structure is displayed in a first area and thumbnails representing the media content clips are displayed in a second viewing area. Hierarchy 102 enables the ability to navigate to the location of thumbnails 104. However, hierarchy 102 is a hierarchy only and is not tied to the current location of the browsing of the thumbnails 104. Accordingly, it is difficult (if not impossible) to determine where in the hierarchy 102 the thumbnails 104 are located.

Figure 1B:
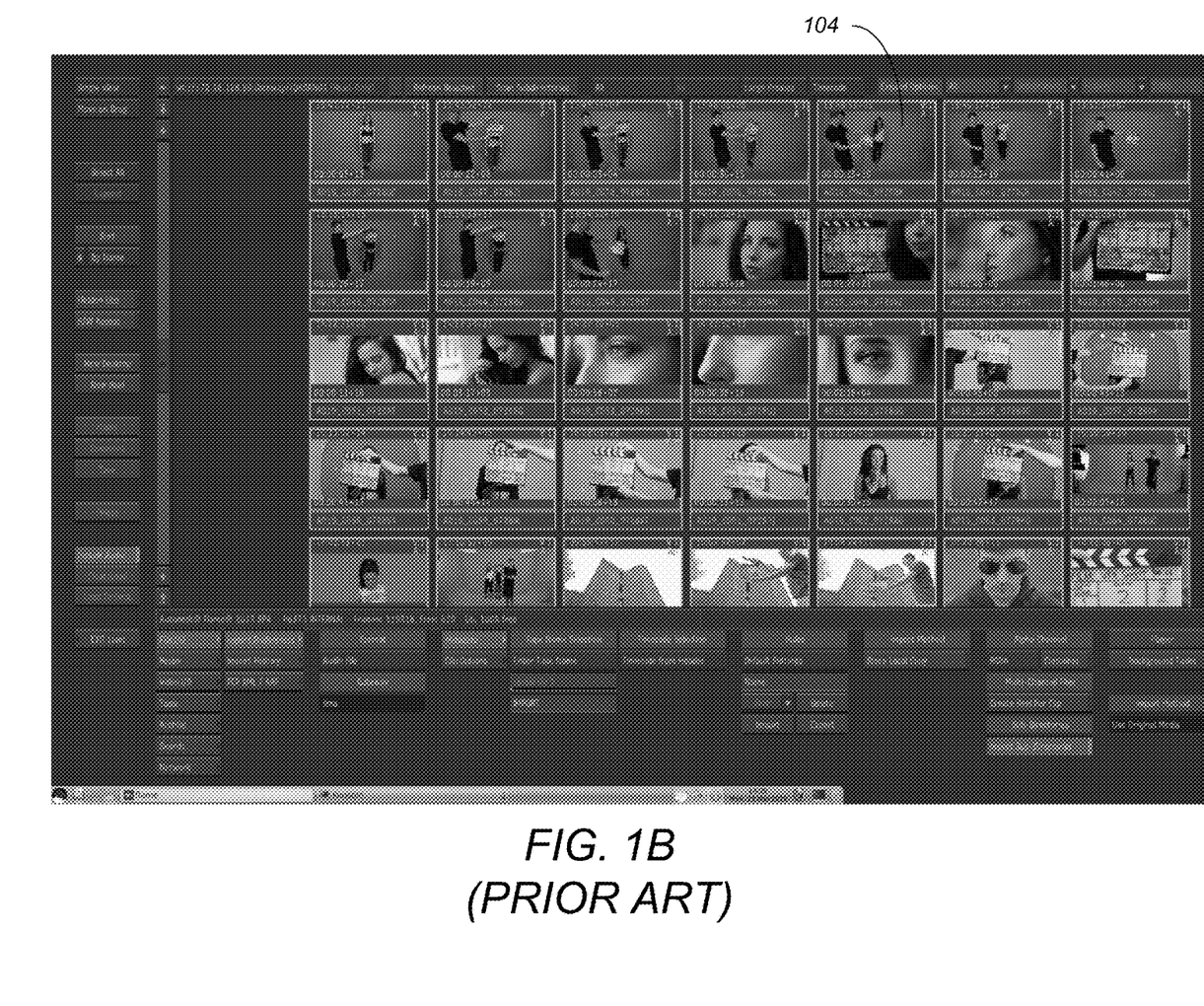
FIG. 1B illustrates a prior art screen shot for viewing media content as thumbnails 104 without the simultaneous display of the hierarchy of FIG. 1A.

FIG. 1B illustrates a prior art screen shot for viewing media content as thumbnails 104 without the simultaneous display of the hierarchy of FIG. 1A. As illustrated, there is no ability to determine where the thumbnails are located within the folder/storage structure. Instead, the user must scroll through all of the thumbnails without any contextual reference point.

Figure 1C:
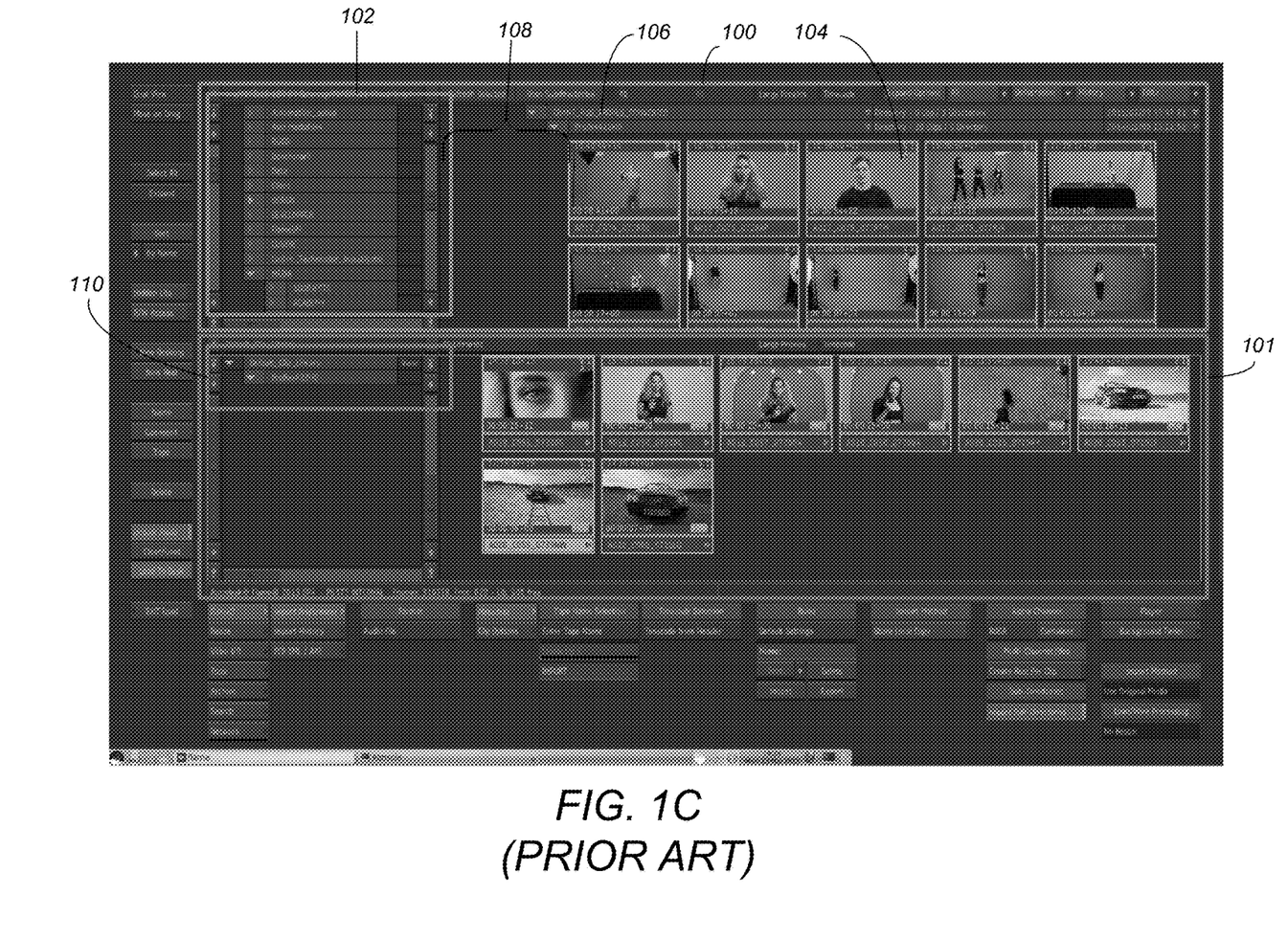
FIG. 1C illustrates a prior art screen shot for viewing media content/clips within a generic file system as well as within an internal media library.

FIG. 1C illustrates a prior art screen shot for viewing media content/clips within a generic file system as well as within an internal media library. Area 100 illustrates the browsing of media files within a generic file system while area 101 illustrates browsing media files within an internal media library of the prior art. Similar to FIG. 1A, both the independent hierarchy 102 is displayed as well as thumbnails 104. However, in FIG. 1C, to provide context within the generic file system 100, thumbnails 104 are displayed within a hierarchical structure 106. Media/thumbnails 104 are indented within the hierarchy 106 causing available real-estate 108 to reduce in size as the hierarchy 106 becomes deeper, and reducing the amount of tiles/thumbnails 104 that can be viewed at once. Scrolling could push the identification of the containing folder and its hierarchy off-screen causing the user to loose context. As illustrated, media clips are represented by thumbnails 104 and as a user progresses deeper into a hierarchy 106, the set of thumbnail images 104 are indented creating increasingly more grey space 108 that is unused. Eventually, if the hierarchy 106 is deep enough, the thumbnails 104 may not be viewable at all. Similarly, if the user scrolls through the clips, the hierarchy 106 and the ability to determine the context of the clip within the library/hierarchy 106 would disappear.

Similarly, the user can also view the media content within an internal media library 101. Such a media library 101 displays a single library at a time (as identified by the selected library in area 110.

In another prior art system (e.g., FINAL CUT PRO X™ available from APPLE™), media is organized based on a specific attribute, such as the date the content was created. For instance in such a case, each day is a container, akin to a folder, and it contains all media created on that date. All dates are presented on the same level so the hierarchy is never more than one level deep. Media can be viewed either as thumbnails or lists integrated in the hierarchy; in the latter case, only the selected media is also viewed as a thumbnail. As you scroll though the data (either in thumbnails or list view), the container identification moves off-screen leaving the user without context.

In yet another prior art product (e.g., PREMIERE PRO™ available from ADOBE™), media is either viewed as a list with a single thumbnail for the selection or as tiled thumbnails from one folder. Context feedback is done through a breadcrumb towards the top of the window.

In view of the above, what is needed is a graphical user interface that provides the ability to scroll through a large amount of images/thumbnails/tiles while also maintaining the visibility of the hierarchical structure that the images are associated with.

SUMMARY OF THE INVENTION

Embodiments of the invention provide a dynamic scrolling feature that allows a user to quickly scroll and scan through a large amount of visual media content data in deep hierarchies while always keeping the context of the data in sight. Users may view content in thumbnail representations while allocating maximum real-estate to the media thus facilitating visual scanning.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

Figure 2:
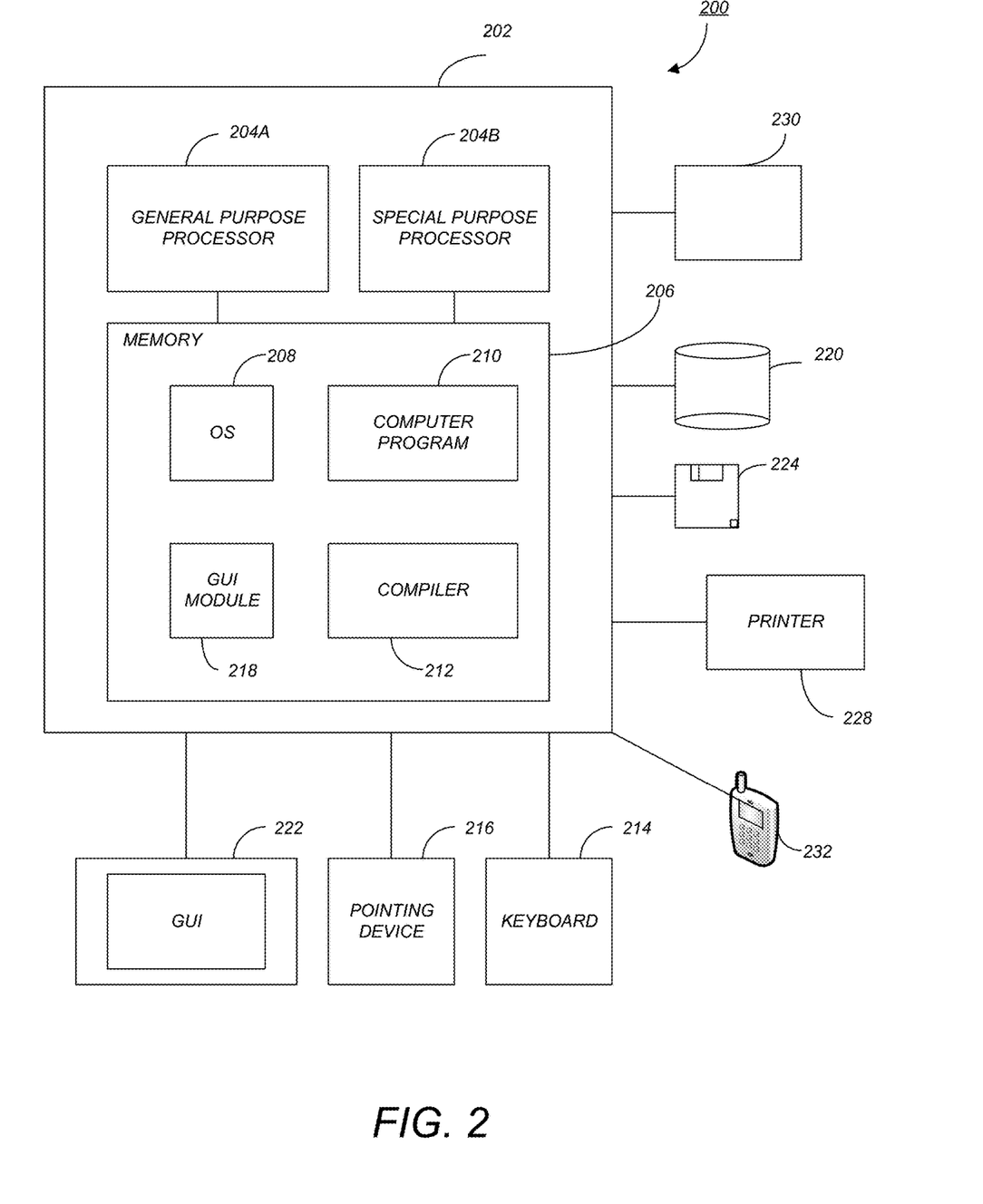
FIG. 2 is an exemplary hardware and software environment used to implement one or more embodiments of the invention.

In the following description, reference is made to the accompanying drawings which form a part hereof, and which is shown, by way of illustration, several embodiments of the present invention. It is understood that other embodiments may be utilized and structural changes may be made without departing from the scope of the present invention.
Overview Embodiments of the invention provide a dynamic scrolling capability to view media content (e.g., thumbnails) within a hierarchy. As used herein, embodiments of the invention may be utilized with any type of content (media or otherwise) that may be represented visually using thumbnails. Such content (referred to herein as media and/or media content) includes video media, static images, etc. As a user scrolls, contents slide in their parent folder until all contents have slid off, then the parent folder itself slides under its own parent, leaving only the next in-line sibling folders visible. This allows the user to always see the direct hierarchy of the contents on screen while hiding less relevant hierarchy information. Further, the user is provided with visual feedback that some parts of the hierarchy have been hidden and can be quickly revealed.
Hardware Environment FIG. 2 is an exemplary hardware and software environment 200 used to implement one or more embodiments of the invention. The hardware and software environment includes a computer 202 and may include peripherals. Computer 202 may be a user/client computer, server computer, or may be a database computer. The computer 202 comprises a general purpose hardware processor 204A and/or a special purpose hardware processor 204B (hereinafter alternatively collectively referred to as processor 204) and a memory 206, such as random access memory (RAM). The computer 202 may be coupled to, and/or integrated with, other devices, including input/output (I/O) devices such as a keyboard 214, a cursor control device 216 (e.g., a mouse, a pointing device, pen and tablet, touch screen, multi-touch device, etc.) and a printer 228. In one or more embodiments, computer 202 may be coupled to, or may comprise, a portable or media viewing/listening device 232 (e.g., an MP3 player, IPOD™, NOOK™, portable digital video player, cellular device, personal digital assistant, etc.). In yet another embodiment, the computer 202 may comprise a multi-touch device, mobile phone, gaming system, internet enabled television, television set top box, or other internet enabled device executing on various platforms and operating systems.

In one embodiment, the computer 202 operates by the general purpose processor 204A performing instructions defined by the computer program 210 under control of an operating system 208. The computer program 210 and/or the operating system 208 may be stored in the memory 206 and may interface with the user and/or other devices to accept input and commands and, based on such input and commands and the instructions defined by the computer program 210 and operating system 208, to provide output and results.

Output/results may be presented on the display 222 or provided to another device for presentation or further processing or action. In one embodiment, the display 222 comprises a liquid crystal display (LCD) having a plurality of separately addressable liquid crystals. Alternatively, the display 222 may comprise a light emitting diode (LED) display having clusters of red, green and blue diodes driven together to form full-color pixels. Each liquid crystal or pixel of the display 222 changes to an opaque or translucent state to form a part of the image on the display in response to the data or information generated by the processor 204 from the application of the instructions of the computer program 210 and/or operating system 208 to the input and commands. The image may be provided through a graphical user interface (GUI) module 218. Although the GUI module 218 is depicted as a separate module, the instructions performing the GUI functions can be resident or distributed in the operating system 208, the computer program 210, or implemented with special purpose memory and processors.

In one or more embodiments, the display 222 is integrated with/into the computer 202 and comprises a multi-touch device having a touch sensing surface (e.g., track pod or touch screen) with the ability to recognize the presence of two or more points of contact with the surface. Examples of multi-touch devices include mobile devices (e.g., IPHONE™, NEXUS S™, DROID™ devices, etc.), tablet computers (e.g., IPAD™, HP TOUCHPAD™), portable/handheld game/music/video player/console devices (e.g., IPOD TOUCH™, MP3 players, NINTENDO 3DS™ PLAYSTATION PORTABLE™, etc.), touch tables, and walls (e.g., where an image is projected through acrylic and/or glass, and the image is then backlit with LEDs).

Some or all of the operations performed by the computer 202 according to the computer program 210 instructions may be implemented in a special purpose processor 204B. In this embodiment, the some or all of the computer program 210 instructions may be implemented via firmware instructions stored in a read only memory (ROM), a programmable read only memory (PROM) or flash memory within the special purpose processor 204B or in memory 206. The special purpose processor 204B may also be hardwired through circuit design to perform some or all of the operations to implement the present invention. Further, the special purpose processor 204B may be a hybrid processor, which includes dedicated circuitry for performing a subset of functions, and other circuits for performing more general functions such as responding to computer program 210 instructions. In one embodiment, the special purpose processor 204B is an application specific integrated circuit (ASIC).

The computer 202 may also implement a compiler 212 that allows an application or computer program 210 written in a programming language such as COBOL, PASCAL, C++, FORTRAN, or other language to be translated into processor 204 readable code. Alternatively, the compiler 212 may be an interpreter that executes instructions/source code directly, translates source code into an intermediate representation that is executed, or that executes stored precompiled code. Such source code may be written in a variety of programming languages such as JAVA™ PERL™ BASIC™, etc. After completion, the application or computer program 210 accesses and manipulates data accepted from I/O devices and stored in the memory 206 of the computer 202 using the relationships and logic that were generated using the compiler 212.

The computer 202 also optionally comprises an external communication device such as a modem, satellite link, Ethernet card, or other device for accepting input from, and providing output to, other computers 202.

In one embodiment, instructions implementing the operating system 208, the computer program 210, and the compiler 212 are tangibly embodied in a non-transitory computer-readable medium, e.g., data storage device 220, which could include one or more fixed or removable data storage devices, such as a zip drive, floppy disc drive 224, hard drive, CD-ROM drive, tape drive, etc. Further, the operating system 208 and the computer program 210 are comprised of computer program 210 instructions which, when accessed, read and executed by the computer 202, cause the computer 202 to perform the steps necessary to implement and/or use the present invention or to load the program of instructions into a memory 206, thus creating a special purpose data structure causing the computer 202 to operate as a specially programmed computer executing the method steps described herein. Computer program 210 and/or operating instructions may also be tangibly embodied in memory 206 and/or data communications devices 230, thereby making a computer program product or article of manufacture according to the invention. As such, the terms "article of manufacture," "program storage device," and "computer program product," as used herein, are intended to encompass a computer program accessible from any computer readable device or media.

Of course, those skilled in the art will recognize that any combination of the above components, or any number of different components, peripherals, and other devices, may be used with the computer 202.

Figure 3:
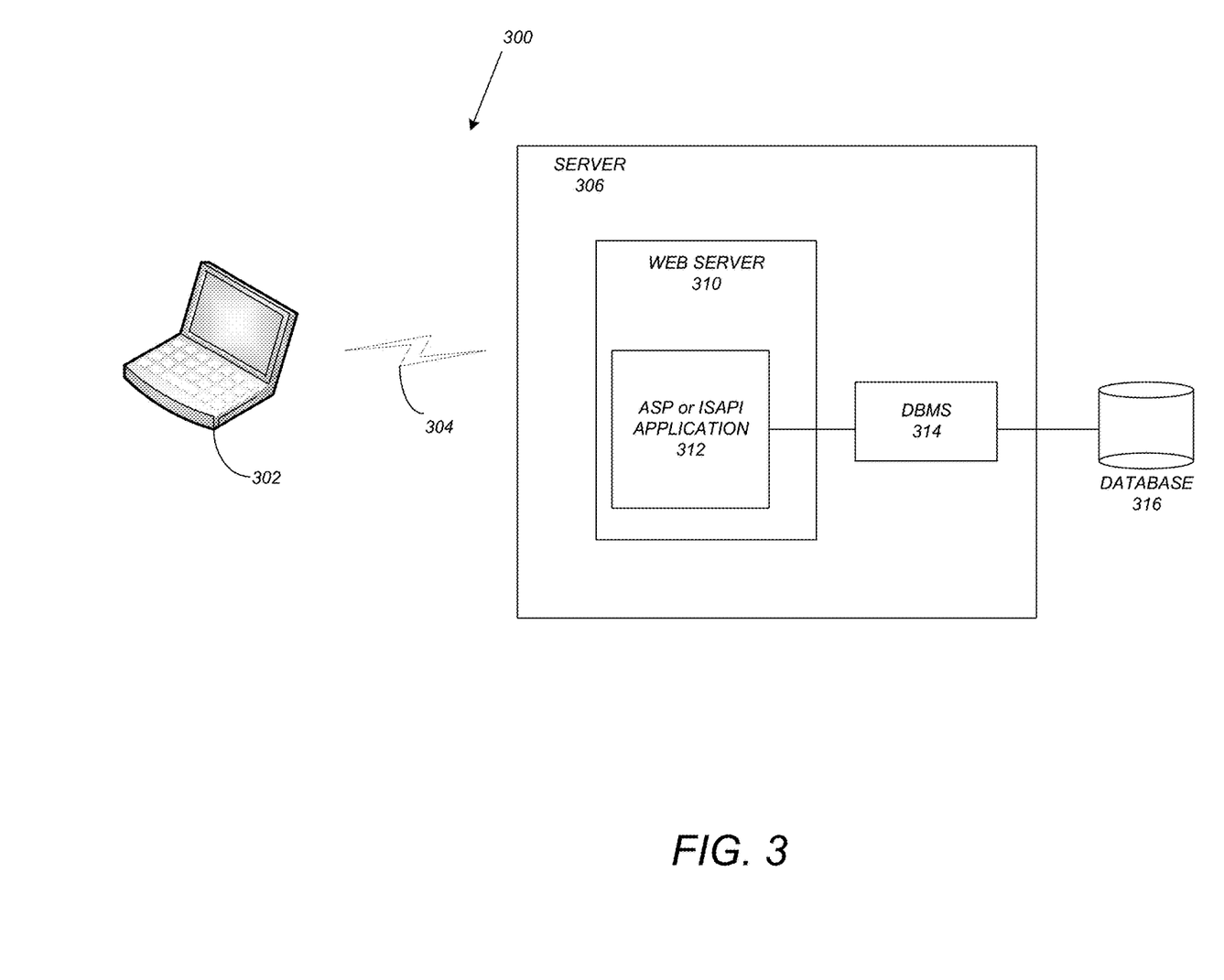
FIG. 3 schematically illustrates a typical distributed computer system using a network to connect client computers to server computers in accordance with one or more embodiments of the invention.

FIG. 3 schematically illustrates a typical distributed computer system 300 using a network 304 to connect client computers 302 to server computers 306. A typical combination of resources may include a network 304 comprising the Internet, LANs (local area networks), WANs (wide area networks), SNA (systems network architecture) networks, or the like, clients 302 that are personal computers or workstations (as set forth in FIG. 2), and servers 306 that are personal computers, workstations, minicomputers, or mainframes (as set forth in FIG. 2). However, it may be noted that different networks such as a cellular network (e.g., GSM [global system for mobile communications] or otherwise), a satellite based network, or any other type of network may be used to connect clients 302 and servers 306 in accordance with embodiments of the invention.

A network 304 such as the Internet connects clients 302 to server computers 306. Network 304 may utilize ethernet, coaxial cable, wireless communications, radio frequency (RF), etc. to connect and provide the communication between clients 302 and servers 306. Clients 302 may execute a client application or web browser and communicate with server computers 306 executing web servers 310. Such a web browser is typically a program such as MICROSOFT INTERNET EXPLORER™ MOZILLA FIREFOX™, OPERA™, APPLE SAFARI™, GOOGLE CHROME™, etc. Further, the software executing on clients 302 may be downloaded from server computer 306 to client computers 302 and installed as a plug-in or ACTIVEX™ control of a web browser. Accordingly, clients 302 may utilize ACTIVEX™ components/component object model (COM) or distributed COM (DCOM) components to provide a user interface on a display of client 302. The web server 310 is typically a program such as MICROSOFT'S INTERNET INFORMATION SERVER™.

Web server 310 may host an Active Server Page (ASP) or Internet Server Application Programming Interface (ISAPI) application 312, which may be executing scripts. The scripts invoke objects that execute business logic (referred to as business objects). The business objects then manipulate data in database 316 through a database management system (DBMS) 314. Alternatively, database 316 may be part of, or connected directly to, client 302 instead of communicating/obtaining the information from database 316 across network 304. When a developer encapsulates the business functionality into objects, the system may be referred to as a component object model (COM) system. Accordingly, the scripts executing on web server 310 (and/or application 312) invoke COM objects that implement the business logic. Further, server 306 may utilize MICROSOFT'S™ Transaction Server (MTS) to access required data stored in database 316 via an interface such as ADO (Active Data Objects), OLE DB (Object Linking and Embedding DataBase), or ODBC (Open DataBase Connectivity).

Generally, these components 300-316 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Although the terms "user computer", "client computer", and/or "server computer" are referred to herein, it is understood that such computers 302 and 306 may be interchangeable and may further include thin client devices with limited or full processing capabilities, portable devices such as cell phones, notebook computers, pocket computers, multi-touch devices, and/or any other devices with suitable processing, communication, and input/output capability.

Of course, those skilled in the art will recognize that any combination of the above components, or any number of different components, peripherals, and other devices, may be used with computers 302 and 306.

Software Embodiment Overview

Embodiments of the invention are implemented as a software application on a client 302 or server computer 306. Further, as described above, the client 302 or server computer 306 may comprise a thin client device or a portable device that has a multi-touch-based display.

Software Embodiment Details

In smart phone devices (or thin client devices), as a user scrolls, the contents of a container may slide up and under a heading identifying the container of the contents. When all contents from the container have slid in, the container itself may slide out of screen. Such a paradigm may be used for single level organizations of data.

Embodiments of the invention expand such a single level organization paradigm into multi-level hierarchies. As a user scrolls, contents slide in their parent folder until all contents have slide off, then the parent folder itself slides under its own parent, leaving only the next in-line sibling folders visible. This allows the user to always see the direct hierarchy of the contents on screen while hiding less relevant hierarchy information. The user is provided with visual feedback that some parts of the hierarchy have been hidden and can be quickly revealed.

In view of the above, embodiments of the invention may enable/provide one or more of the following:

- Allow the user to view clips and/or static images (together referred to herein as media and/or media content) as scrubbable thumbnails within the current workspace;
- Allow the user to browse media in thumbnails while viewing the working area (top and bottom) at once;
- Allow the user to quickly and easily scan/scroll through all thumbnails within the current workspace;
- Help the user know what location he is browsing while viewing thumbnails;
- Allow the user to move, copy and delete media content viewed as thumbnails;
- Allow the user to view media content from disconnected locations;
- Allow the user to customize how media content is viewed:
  - Change the size of the thumbnails;
  - View media on a second monitor;
  - Hide all media;
  - Have media take up the full screen real-estate;
  - Offer dual view of the media when in full screen
- Allow the user to view any media, whether in list or thumbnails in the full screen player.

As described above, media within a media panel may be viewed as a list or as scrubbable thumbnails within a hierarchy. Further, folders (and subfolders) in a hierarchy can be expanded or collapsed at once. In addition, media can be scrolled.

Figure 4A:
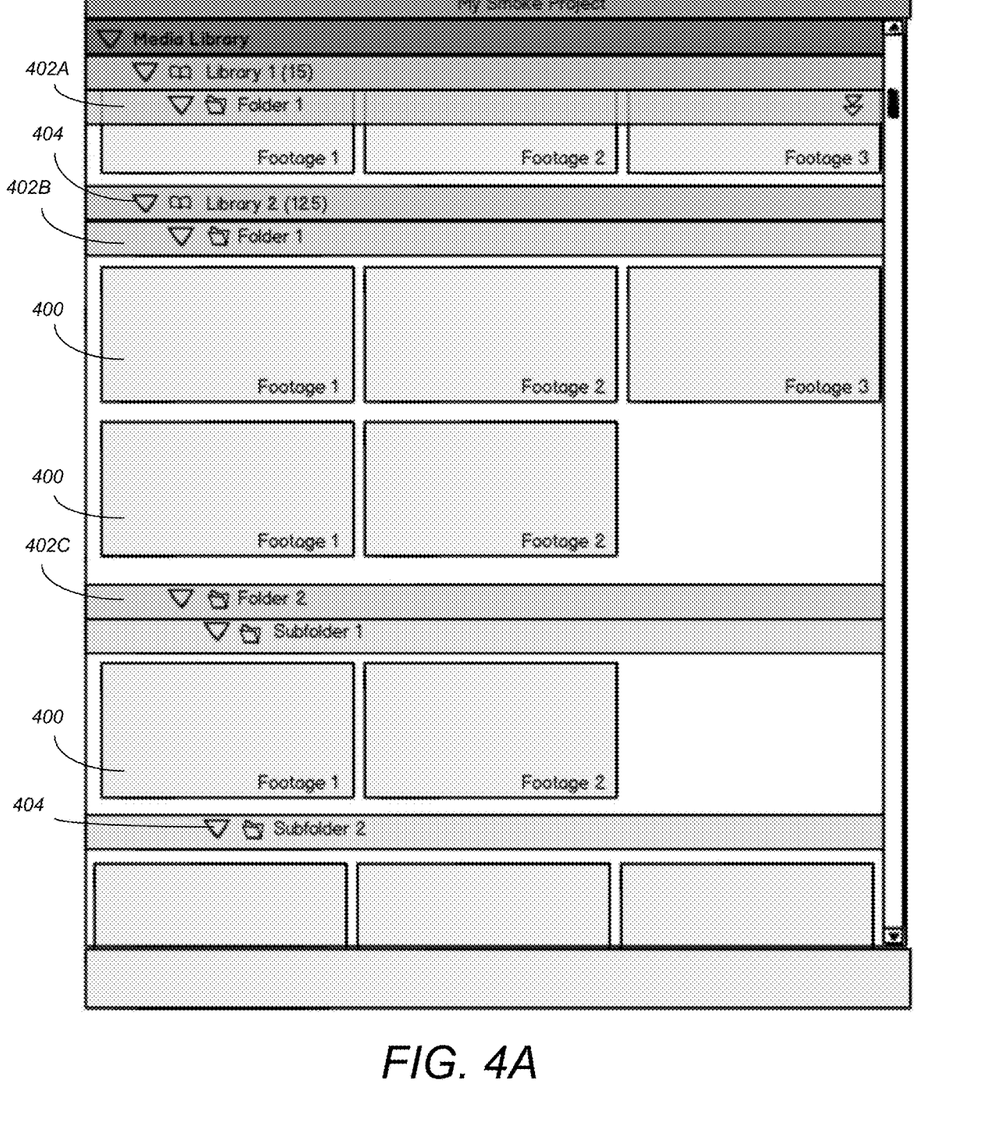
FIGS. 4A and 4B illustrate the browsing of media in thumbnails within a media panel before and after scrolling in accordance with one or more embodiments of the invention.
Figure 4B:
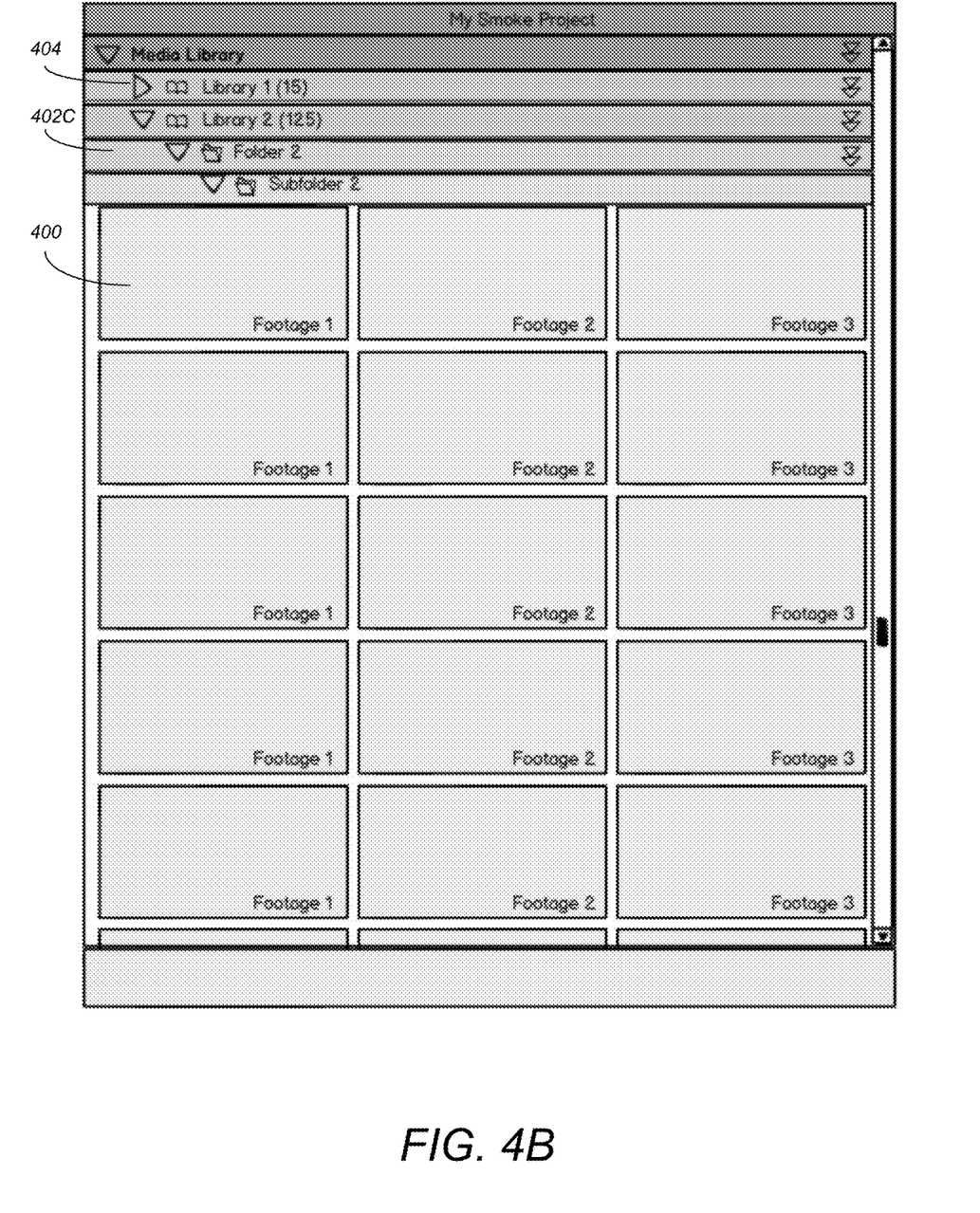

FIGS. 4A and 4B illustrate the browsing of media in thumbnails within a media panel before and after scrolling in accordance with one or more embodiments of the invention. As illustrated, the user is allowed to scroll through media quickly while keeping their sense of location. Maximum screen real-estate is given to the image so media content 400 are not indented (i.e., thumbnails representing media content such as clips and/or static images are not intended since their hierarchy always remain on screen). Folders 402A-402C (collectively referred to as folders 402) can be expanded and collapsed one by one (e.g., by selecting the triangle 404) or at once with their descendants. Content (e.g., clips and/or static images 400) scrolls out of view by being pushed in and under their parent (while scrolling) until the parent has no more exposed content. Then the parent is pushed in and under its own parent. The hierarchy is never completely "pushed out" of the screen while scrolling, the direct hierarchy is always kept on screen. Further, an indirect hierarchy may be available but not kept on screen (e.g., to keep as much real-estate for the images as possible). When contents (e.g., clips and/or static images 400) are hidden, an indication is shown on the parent that allows its content to be expanded at once (e.g., using the triangle 404). Top-structures are never hidden, they are always visible. In addition, while scrolling, embodiments of the invention may provide inertia like on smart phones, with bouncing at the end of the list.

Media 400 or folders 402 can be grabbed and moved over a parent with hidden children and cause the children to be shown. Further, media 400 and folders 402 can be re-ordered, moved or copied gesturally (similar to interactions in a list view).

In view of the above, one may note that FIG. 4A illustrates the initial appearance of a hierarchical view containing media content thumbnails. As the user scrolls, the content/tiles/thumbnails 400 that are displayed dynamically changes. As an example, while scrolling down, FIG. 4B illustrates how content from the first library is collapsed, and content from the second library is displayed. However, once the user has scrolled below all of the content 400 in folder 1 in the second library, folder 1 disappears (collapses) and only the content of folder 2 is displayed (as illustrated in FIG. 4B). In this regard, containers (e.g., library 1 with a triangle 404 pointing sideways instead of down) appear closed when all of the container's content has been scrolled away. In this regard, expanding or using the chevron (i.e., triangle 404) may have the same/similar effect.

In addition to the browsing illustrated in FIGS. 4A and 4B, embodiments of the invention may also provide the ability to split the screen horizontally and/or vertically with a dual view available (e.g., when in full screen). In this regard, when the screen is split, both/all of the panels displaying different libraries/folders/thumbnails may have independent controls and search capabilities.

When sorting and moving media in the different panels, media content (in tiles) may be sorted by metadata facets either ascending, descending, or manual. Sorting facets may include name, date imported, size, etc. Sorting may be achieved through contextual menus (e.g., when clicking between clips/images), and/or through the header of a panel. In this regard, the header may become a pop-up list when in tiles view and arrows/chevrons 404 are displayed (clicking on the label or arrows 404 may bring up a pop-up menu with all of the available [or a subset of] sorting criteria).

As described above, when browsing media in a media hub/internal library, such browsing may be the same as when browsing media in a media panel. In other words, the user may have the capability to: view media content as scrubbable thumbnails integrated within the hierarchy; import, wire or restore media content while viewed as thumbnails; and export, wire or archive media content while viewed as thumbnails.

Figure 5A:
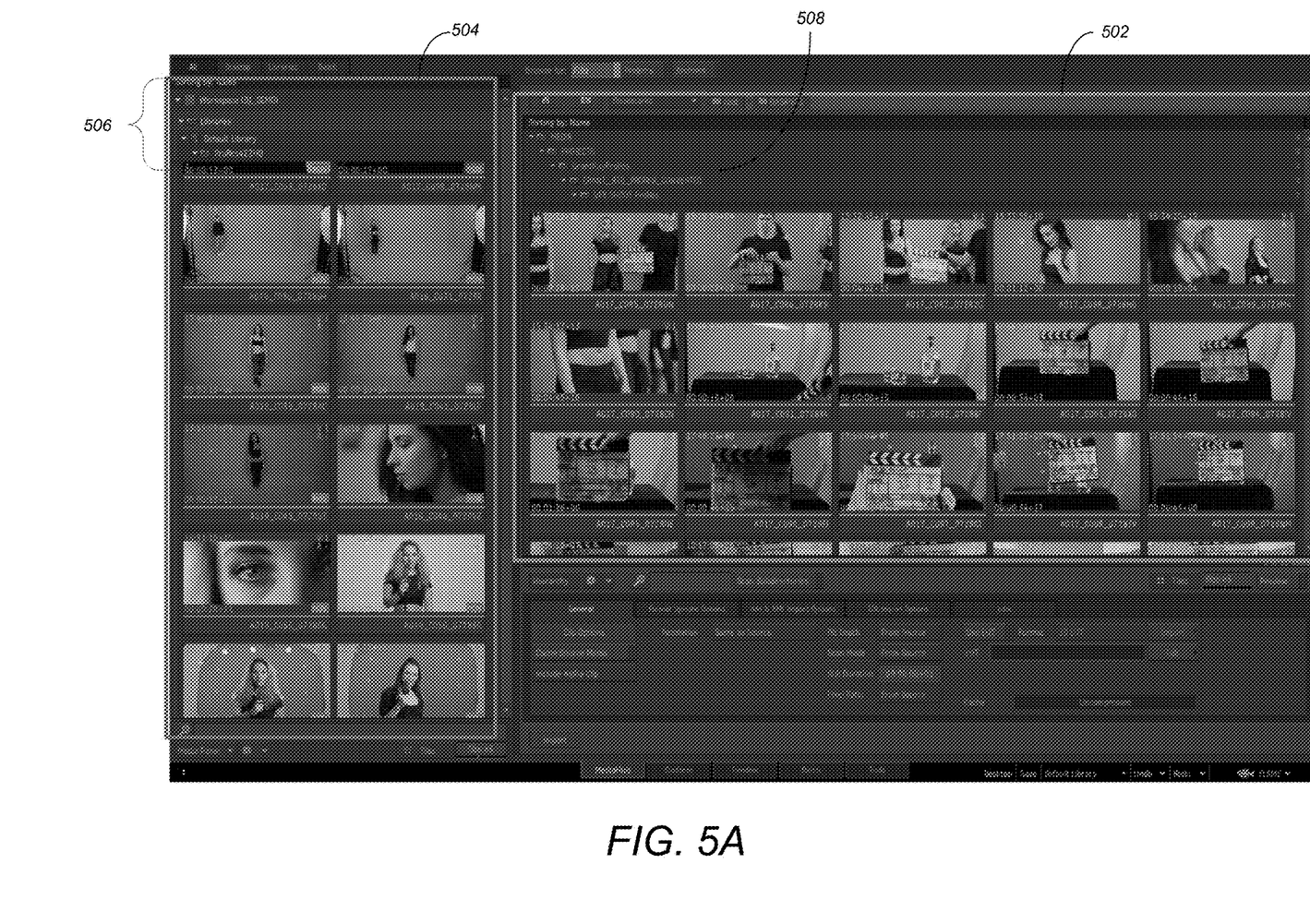
FIGS. 5A and 5B illustrate screen shots of the browsing of media in thumbnails within a media panel in accordance with one or more embodiments of the invention.
Figure 5B:
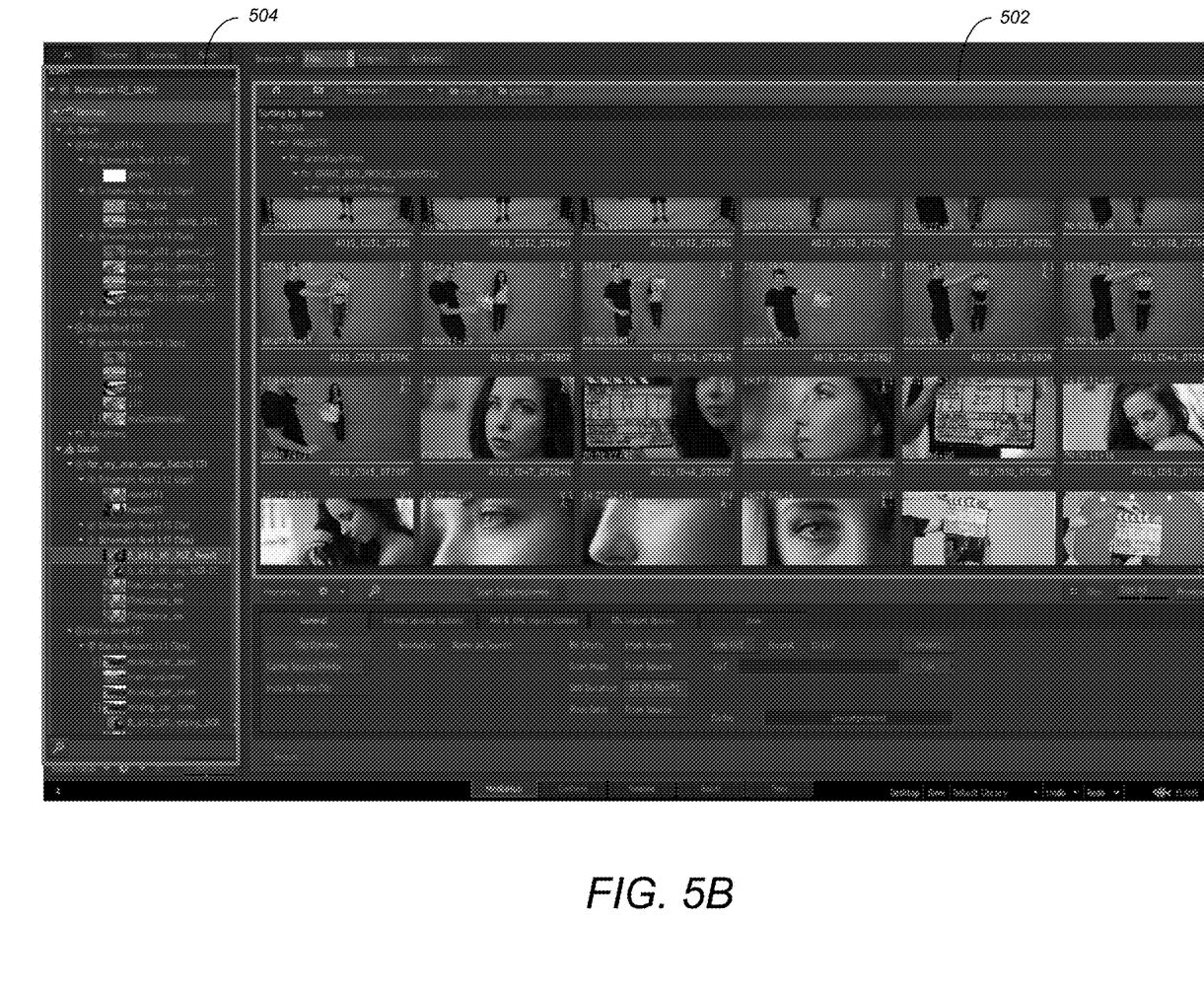

FIGS. 5A and 5B illustrate screen shots of the browsing of media in thumbnails within a media panel in accordance with one or more embodiments of the invention. To illustrate the differences between embodiments of the invention and the prior art, the content in FIGS. 5A and 5B is the same as that displayed in the prior art screen shots of FIGS. 1A-1C. In FIG. 5A, thumbnails are displayed in both the generic file system 502 as well as an internal media library 504. As illustrated, the thumbnails (in both generic file system 502 and internal media library 504) are left aligned thereby maximizing screen real-estate. In contrast to the prior art hierarchical display (e.g., of FIG. 1C) in which a single library 110 is displayed, the complete internal project hierarchy 506 for viewed media is displayed in the internal media library 504. Further, within the prior art generic file system 102, the prior art hierarchy is not tied to the current location of the browsing. In contrast, within a generic file system 502 of embodiments of the invention, the complete file system hierarchy 508 for the currently viewed media is displayed.

Similar to FIG. 5A, in FIG. 5B, thumbnails are displayed in the generic file system 502, and smaller versions of the thumbnails are displayed in the internal media library 504. As illustrated, the complete file system hierarchies are displayed enabling the ability for the user to easily determine the context/location of the media content without effort.

In view of the above, embodiments of the invention provide an interactive and dynamic scrolling of media content within a hierarchy. At the top of a hierarchy, the graphical user interface appears similar to traditional displays. However, as the user scrolls, the hierarchy builds at the top of the browser. As images are scrolled out of viewing range, the hierarchy structure dynamically updates. In this regard, as the user scrolls through a parent folder (i.e., a folder that contains a subfolder or multiple subfolders), sibling folders may collapse to the point of the parent folder (and may disappear entirely) such that the hierarchy for the current folder being viewed is the only hierarchical structure that is displayed.

Similarly, if the user scrolls back up, the hierarchy (and content within folders of the hierarchy) automatically and dynamically expand as the scrolling is performed. In this regard, embodiments of the invention provide the ability to always show a hierarchy within a sophisticated project structure while assigning as much screen real estate as possible when browsing images. Further, embodiments provide context (by only showing the hierarchy for the current folder/project being viewed) while maintaining the ability to expand and view the full hierarchy as desired.

Logical Flow

Figure 6:
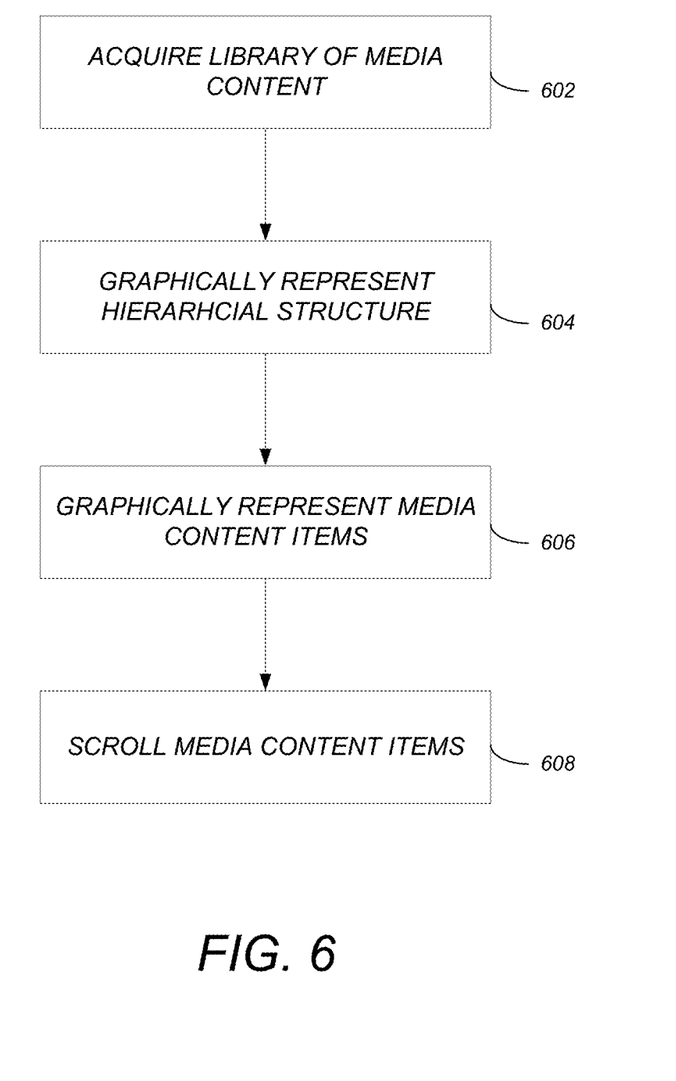
FIG. 6 illustrates the logical flow for structuring an interactive and dynamic display of hierarchically organized media content in accordance with one or more embodiments of the invention.

FIG. 6 illustrates the logical flow for structuring an interactive and dynamic display of hierarchically organized media content in accordance with one or more embodiments of the invention.

At step 602, a library of media content is acquired. The media content is hierarchically organized in a hierarchical structure having multiple levels. One or more of the multiple levels contain multiple media content items.

At step 604, the hierarchical structure is graphically represented utilizing text corresponding to the multiple levels of the hierarchical structure. A child level is represented below and indented from a parent level of the child level. Such a step may include providing visual feedback that one of the multiple levels of the hierarchical structure has been hidden. Further, the visual feedback may be utilized/activated to reveal the one level that has been hidden. The visual feedback may consist of a chevron that rotates to indicate whether the one level is hidden or is already expanded.

At step 606, the multiple media content items in the multiple levels are graphically represented utilizing representative images for each of the multiple media content items. The representative images are left justified with respect to a highest level of the multiple hierarchies, and are displayed directly below the text corresponding to the level containing the media content items.

At step 608, the multiple media content items are scrolled. As the scrolling is performed: the graphical representing/representation is dynamically updated; the representative images slide in the level containing the multiple media content items until all of the representative images have slid off; and once all of the representative images have slid off, the text corresponding to the containing level slides under its own parent, leaving text corresponding to sibling levels of the containing level displayed. In addition, once all of the representative images have slid off, text representing a hierarchy corresponding to the containing level may be the only text displayed for the hierarchical structure.

In addition, step 608 may also include the expansion of the hierarchy and media content items as the user scrolls in the opposite direction. In this regard, as the scrolling is performed, the graphical representation of the hierarchical structure and the multiple media content items are (automatically and) dynamically expanded by: displaying the text corresponding to the multiple levels; and displaying the representative images for each of the multiple media content items directly under the text corresponding to the level containing the media content items.

All of the above steps involve outputting the scrolling process/graphical representations to a display device (e.g., a cell phone, a tablet device, a computer, a thin-client device, etc.). Further, the scrolling may be performed based on the movement of a cursor, via keyboard controls, or via input from a user's finger/hand (e.g., a gesture).

Further to the above, the library of media content may consist of an internal media library that is displayed in first area of a computer window. Steps 602-608 may then be repeated for a generic file system that is displayed in a second area of the computer window. In such an embodiment, the first area and the second area may be adjacent to each other and simultaneously displayed.

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for structuring an interactive and dynamic display of hierarchically organized media content, comprising:
acquiring a library of media content, wherein the media content is hierarchically organized in a hierarchical structure having multiple levels, wherein one or more of the multiple levels contain multiple media content items;
graphically representing the hierarchical structure utilizing text corresponding to the multiple levels of the hierarchical structure, wherein a child level is represented below and indented from a parent level of the child level;

graphically representing the multiple media content items in the multiple levels utilizing representative images for each of the multiple media content items, wherein the representative images are left justified with respect to a highest level of the multiple hierarchies, and are displayed directly below the text corresponding to the level containing the media content items, wherein such graphically representing thereby maximizes screen real estate for the multiple media content items; and scrolling the multiple media content items, wherein as the scrolling is performed:
the graphical representing is dynamically updated;
the representative images slide in the level containing the multiple media content items until all of the representative images have slid off; and
once all of the representative images have slid off, the text corresponding to the containing level slides under its own parent, leaving text corresponding to sibling levels of the containing level displayed.

2. The computer-implemented method of claim 1, wherein once all of the representative images have slid off, text representing a hierarchy corresponding to the containing level is the only text displayed for the hierarchical structure.

3. The computer-implemented method of claim 1, further comprising as the scrolling is performed:
dynamically expanding the graphical representation of the hierarchical structure and the multiple media content items by:
displaying the text corresponding to the multiple levels; and
displaying the representative images for each of the multiple media content items directly under the text corresponding to the level containing the media content items.

4. The computer-implemented method of claim 1, further comprising:
providing visual feedback that one of the multiple levels of the hierarchical structure has been hidden; and
utilizing the visual feedback to reveal the one level that has been hidden.

5. The computer-implemented method of claim 4, wherein the visual feedback comprises a chevron that rotates to indicate whether the one level is hidden or is already expanded.

6. The computer-implemented method of claim 1, wherein:
the library of media content comprises an internal media library that is displayed in first area of a computer window;
the steps of claim 1 are repeated for a generic file system that is displayed in a second area of the computer window; and
the first area and the second area are adjacent and simultaneously displayed.

7. A system for structuring an interactive and dynamic display of hierarchically organized media content comprising:
(a) a computer having a memory;
(b) an application executing on the computer;
(c) a library of media content, stored in the memory, that is hierarchically organized in a hierarchical structure having multiple levels, wherein one or more of the multiple levels contain multiple media content items;
(d) a display coupled to the computer, wherein:
(1) the hierarchical structure is graphically represented on the display, via the application, utilizing text corresponding to the multiple levels of the hierarchical structure, wherein a child level is represented below and indented from a parent level of the child level;
(2) the multiple media content items in the multiple levels are graphically represented on the display, via the application, utilizing representative images for each of the multiple media content items, wherein the representative images are left justified with respect to a highest level of the multiple hierarchies, and are displayed directly below the text corresponding to the level containing the media content items, wherein such graphical representation thereby maximizes screen real estate for the multiple media content items; and
(e) a scrolling device coupled to the computer, wherein the scrolling device scrolls the multiple media content items, wherein as the scrolling is performed:
(1) the display is dynamically updated;
(2) the representative images slide in the level containing the multiple media content items until all of the representative images have slid off; and
(3) once all of the representative images have slid off, the text corresponding to the containing level slides under its own parent, leaving text corresponding to sibling levels of the containing level displayed.

8. The system of claim 7, wherein once all of the representative images have slid off, text representing a hierarchy corresponding to the containing level is the only text displayed for the hierarchical structure.

9. The system of claim 7, further comprising as the scrolling is performed:
dynamically expanding the graphical representation of the hierarchical structure and the multiple media content items by:
displaying the text corresponding to the multiple levels; and
displaying the representative images for each of the multiple media content items directly under the text corresponding to the level containing the media content items.

10. The system of claim 7, further comprising:
providing visual feedback that one of the multiple levels of the hierarchical structure has been hidden; and
utilizing the visual feedback to reveal the one level that has been hidden.

11. The system of claim 10, wherein the visual feedback comprises a chevron that rotates to indicate whether the one level is hidden or is already expanded.

12. The system of claim 7, wherein:
the library of media content comprises an internal media library that is displayed in first area of a computer window;
the steps of claim 1 are repeated for a generic file system that is displayed in a second area of the computer window; and
the first area and the second area are adjacent and simultaneously displayed.

* * * * *